July 7, 1925.

C. E. BALDWIN

MEASURING MACHINE

Filed May 16, 1922

C. E. BALDWIN

MEASURING MACHINE

Filed May 16, 1922

Inventor
Charles Ernest Baldwin
By S. Arthur Baldwin
Attorney

July 7, 1925. 1,544,626
C. E. BALDWIN
MEASURING MACHINE
Filed May 16, 1922 9 Sheets-Sheet 3

Inventor
Charles Ernest Baldwin
By S. Arthur Baldwin,
Attorney

July 7, 1925.　　　　　　　　　　　　　　　　　　　1,544,626
C. E. BALDWIN
MEASURING MACHINE
Filed May 16, 1922　　　　9 Sheets-Sheet 4

July 7, 1925.

C. E. BALDWIN

MEASURING MACHINE

Filed May 16, 1922

Inventor
Charles Ernest Baldwin
By S. Arthur Baldwin.
Attorney

July 7, 1925.  1,544,626
C. E. BALDWIN
MEASURING MACHINE
Filed May 16, 1922  9 Sheets-Sheet 7

Inventor
Charles Ernest Baldwin
By
S. Arthur Baldwin
Attorney

July 7, 1925.

C. E. BALDWIN

MEASURING MACHINE

Filed May 16, 1922

Inventor
Charles Ernest Baldwin
By S. Arthur Baldwin
Attorney

Patented July 7, 1925.

1,544,626

UNITED STATES PATENT OFFICE.

CHARLES ERNEST BALDWIN, OF JAMESTOWN, NEW YORK.

MEASURING MACHINE.

Application filed May 16, 1922. Serial No. 561,531.

*To all whom it may concern:*

Be it known that I, CHARLES ERNEST BALDWIN, a citizen of the United States, residing at the city of Jamestown, in the county of Chautauqua and State of New York, have invented certain new and useful Improvements in Measuring Machines, of which the following, taken in connection with the accompanying drawings, is a specification.

The invention relates to measuring machines for cloth and other materials which may be drawn between operating rollers to thereby actuate registering mechanism to thereby measure the same; and the improvement consists in providing strong, ribbed or rubber-covered revolubly mounted operating rollers having manually operable means to alternatingly separate said rolls and return the registering mechanism to the zero or neutral position ready for a new measurement, said registering mechanism being positive in its action and simple in its construction and arranged to actuate a pointer over the main single yard dial, and to provide units and tens indicator disks which are automatically actuated by said registering mechanism, releasing or return-to-zero levers being provided at the right and left sides of the machine for actuation by either hand of the operator; and the invention consists in the novel features and combinations hereinafter set forth and claimed.

In the drawings.

Like characters of reference refer to corresponding parts in the several views.

Figure 1:
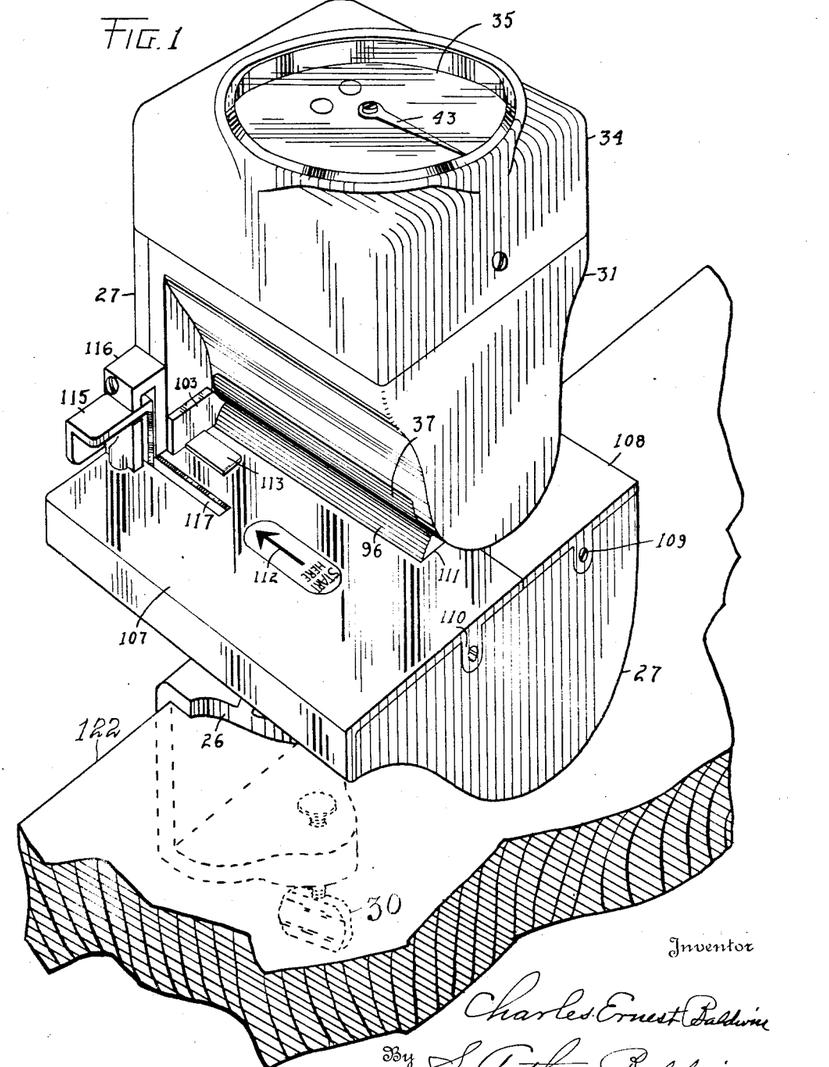
Figure 1 is a perspective view of the improved measuring machine attached to the edge of the store counter or a similar support upon which the material to be measured may be spread.
Figure 2:
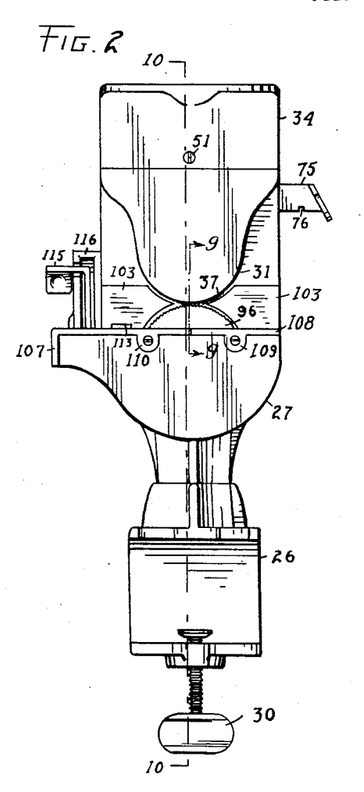
Fig. 2 is a front elevation of the machine detached from the counter or other support.
Figure 3:
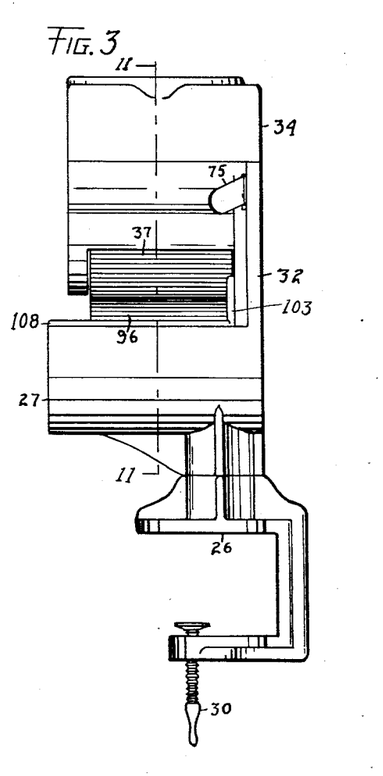
Fig. 3 is an elevation of the right side as shown in Fig. 2, showing its construction and arrangement.
Figure 4:
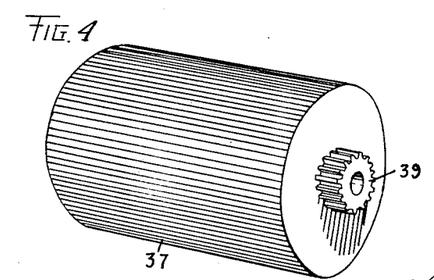
Fig. 4 is a perspective view of one of the operating rollers showing the gear on the end of the same.
Figure 5:
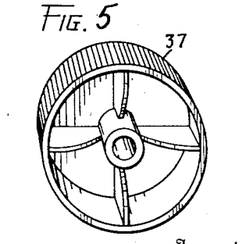
Fig. 5 is a perspective view of the opposite end of said operating roller showing the preferably cylindrical radially braced construction of the same.
Figure 6:
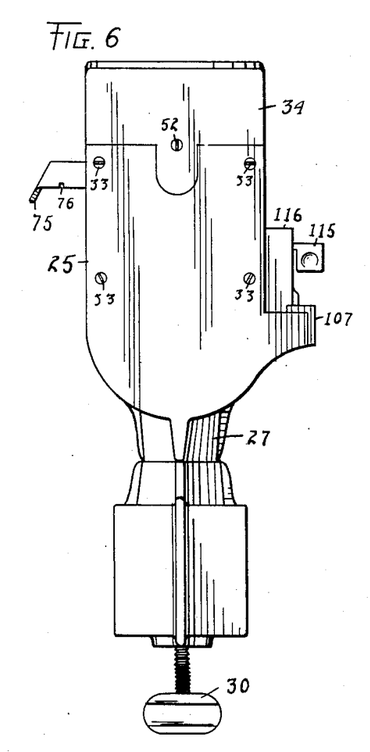
Fig. 6 is a rear elevation.
Figure 7:
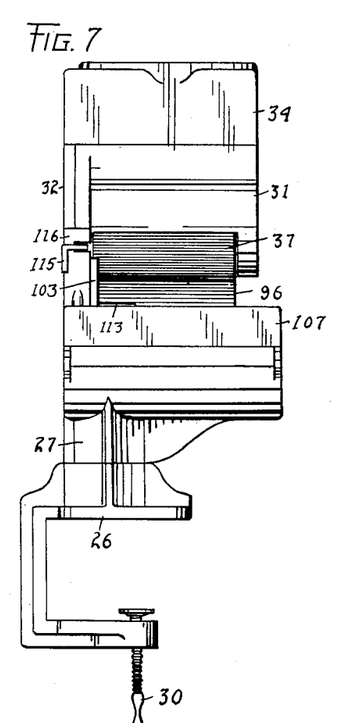
Fig. 7 is an elevation of the left side as shown in Fig. 2.
Figure 8:
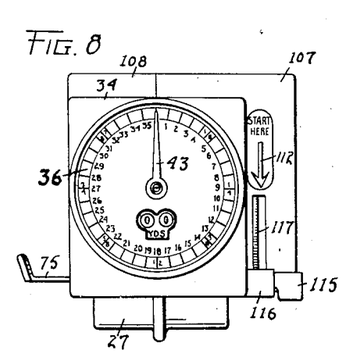
Fig. 8 is a top plan view of the measuring machine showing the measuring and registering dial and the starting point for the measurement and the sidewise extending starting lever.
Figure 9:
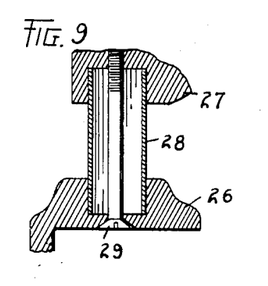
Fig. 9 is a sectional view at line 9—9 in Fig. 2 of the changeable standard or bar connection between the lower clamping portion of the frame and the upper portion by which the height of the machine is adjusted.
Figure 10:
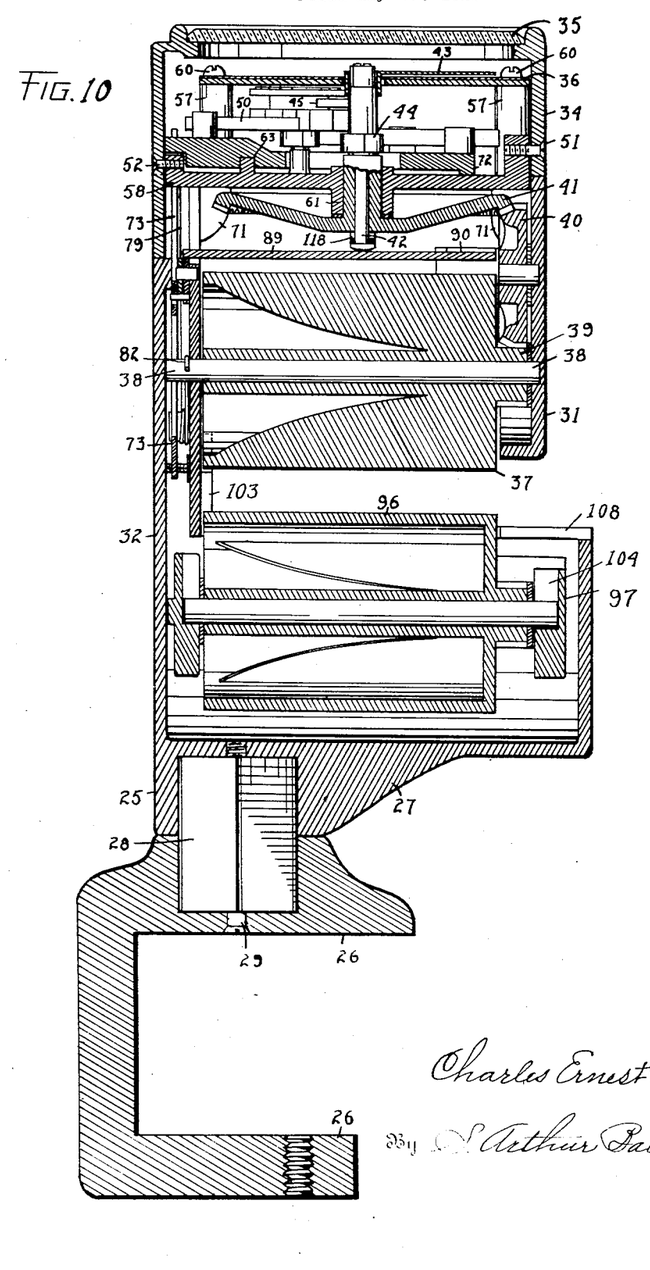
Fig. 10 is a vertical sectional view from the front to rear at line 10—10 in Fig. 2 showing the general arrangement and construction of the different parts.
Figure 11:
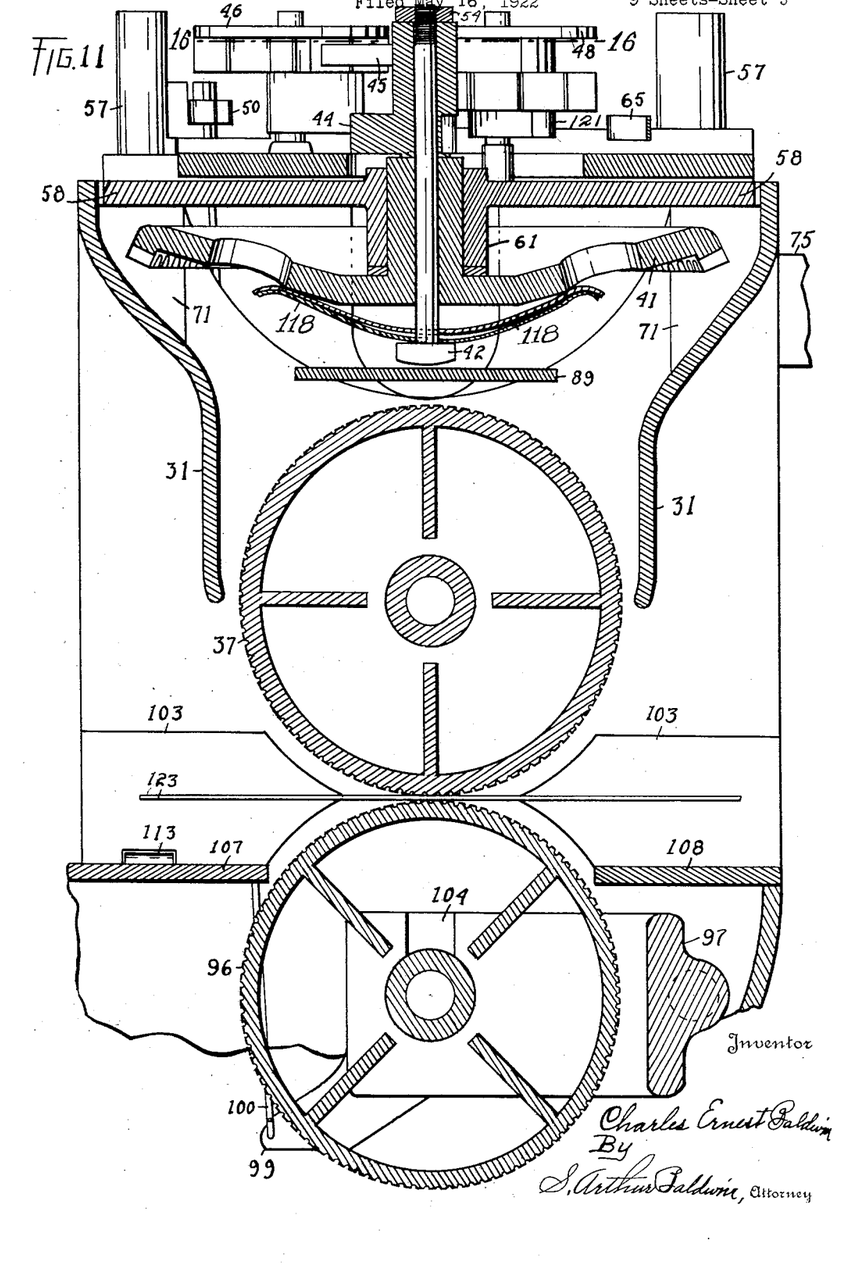
Fig. 11 is a substantially full size vertical sectional view at line 11—11 in Fig. 3 with the upper housing cap and dial removed and a piece of material, as for example, cloth, between the operating rollers.

The numeral 25 designates the supporting frame which consists of the clamping portion 26 and the supporting bracket and back plate 27. The bracket 27 is attached to the clamping portion 26 by means of the standard or bar 28 and has the screw 29 extending lengthwise therethrough as shown in Figs. 9 and 10. This arrangement provides a fixed connection between the two parts 26 and 27 so that by varying the length of the connecting standard or bar 28 and the screw 29, the height of the machine may be varied according to the height of the person desiring to operate the same.

The clamping portion 26 has the clamp screw 30 for attachment to a store counter or other support 122 upon which the material to be measured may be spread. The registering mechanism is largely supported in a frame portion 31 which is attached to the rear back plate 32 of the supporting frame part 25 by the screws 33, thereby rendering the different parts of the machine easy of assemblage and giving strength and rigidity to the entire structure. The casing or frame is completed by a top cap 34 which has the glass top 35 over the main or single yard dial 36. The cap 34 is attached by the screws 51 and 52.

The upper operating roller 37 is revolubly mounted on the shaft 38 in part 31 of the frame and preferably consists of a ribbed cylindrical metallic roller having the radial bracing partitions therein to render the structure as light and strong as possible. The roller 37 also has the gear 39 on its end which preferably meshes in the spur and beveled double gear 40 which connects said gear 39 to the beveled gear 41 on the shaft or bolt 42. The shaft 42 has the heart-shaped cam 44 journaled thereon which assists in returning the registering mechanism to zero. The pointer 43 is mounted upon the upper end of the journal of the heart-shaped cam 44 by means of a spring sleeve 55 which fits closely over the upper end of said journal.

The sleeve or journal portion of the cam 44 has also the arm 45 extending out therefrom to engage the toothed units indicator disk 46, turning said indicator disk 46 one step with each revolution of the bolt or shaft 42. The toothed disk 46 has the projecting arm 47 thereon to turn the tense disk 48 one step with each revolution of the units disk 46.

The disks 46 and 48 are controlled in their one step or tooth movement by means of click springs 49 and 50, the ends of which are bent angularly to engage in the teeth of the respective disks, yet permit their rotation under tension.

The shaft or bolt 42 supports all the parts thereon and tensions the spring 118 by means of the tension nut 54 with set nut 56 so that any desired tension may be given to the spring 118, and the parts mounted thereon to cause the gear 41 to turn said parts when rotatively actuated.

The dial plate 36 is supported on the standards 57, one at each corner of the plate 58, which standards 57 have the holes 59 down through the same to receive the four attaching screws 60 which firmly attach the dial plate 36 and the supporting plate 58 upon the outwardly jutting corner brackets 71 of the frame part 31, upon which corner brackets the plate 58 rests.

The plate 58 has the journal 61 therein for the gear 41 on the shaft 42, and also has the upwardly extending rib 62 which slidably fits within the groove 63 crosswise of the under side of the slidably mounted carrier plate 64. Said carrier plate 64 has the following parts mounted thereon: The units disk 46, the re-setting spring 65 for the tens disk 48, which tens disk is mounted on the plate 58, the spring dog 66 with its adjusting screw 67 in the upwardly extending lug 68 to carry said parts backward and forward with the plate 64 for the purpose hereinafter described.

The re-setting lever 66 has the spring 69 engaging around the same and against a holding projection. Said resetting lever 66 is shaped with a round point 70 which engages the periphery of the heart-shaped cam 44 and enters the indented holding end of said heart-shaped cam 44 to hold the same in the zero or neutral position, when said carrier plate 64 is moved sidewise as hereinafter described. The end 72 of the carrier plate 64 has the downwardly projecting shoe or rib which holds said carrier plate level in relation to the slide 62 thereby holding all the parts therein in correct relation to their inter-engaging parts as said plate 64 slides backward and forward.

In order to slidably move said carrier plate 64 backward and forward, a bell crank lever 73 is pivotally supported on the stud or post 74, and has the releasing lever 75 with its locking notch 76 pivotally attached to the upwardly extending arm of said bell crank lever 73 at 77. Said upwardly extending arm of the bell crank lever 73 extends up alongside the edge of the carrier plate 64, which carrier plate has an angular extension 78 which acts as a stop for the upwardly extending arm of the bell crank lever.

Figures 17, 18, 19, 20:
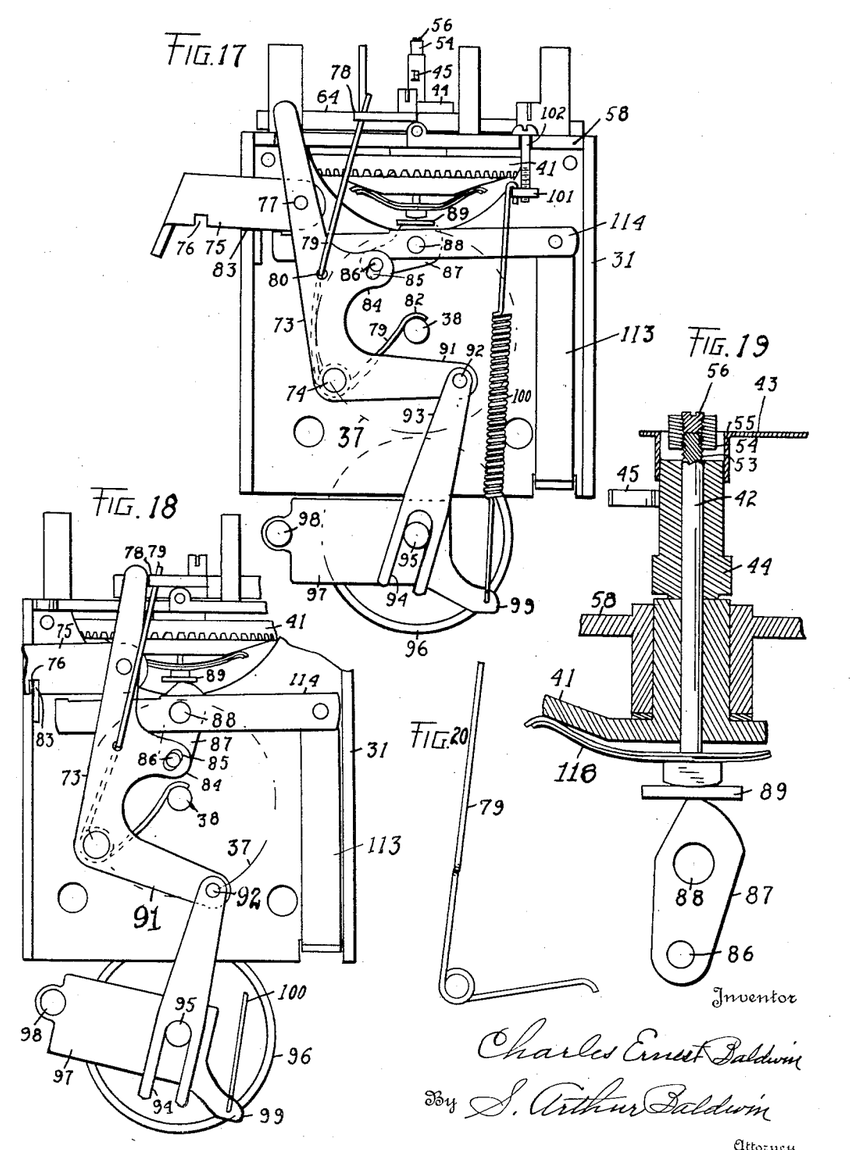
Fig. 17 is a rear elevation of the operating mechanism in the operating position, with the back plate and top cap removed.
Fig. 18 is a similar view with the mechanism in the zero or neutral position showing the manner of separating the operating rollers by forcing the lower roller downward.
Fig. 19 is a vertical sectional view of the clutch mechanism for the units and tens indicator dials in the raised or released position for said dials.
Fig. 20 is a detail elevation of the actuating spring for the carrier plate.

A tension spring 79 wraps around the stud or post 74 and extends through a hole 80 in the bell crank lever 73 and upward through a hole 81 in the extension stop 78 to assist in the control of the carrier plate 64. The opposite end 82 of the spring 79 is curved and extends over the journal 38 of the top roll 37. The notch 76 in the locking lever 75 engages the lower edge of the casing at 83 as shown in Fig. 18.

Figures 21, 22, 23, 24:
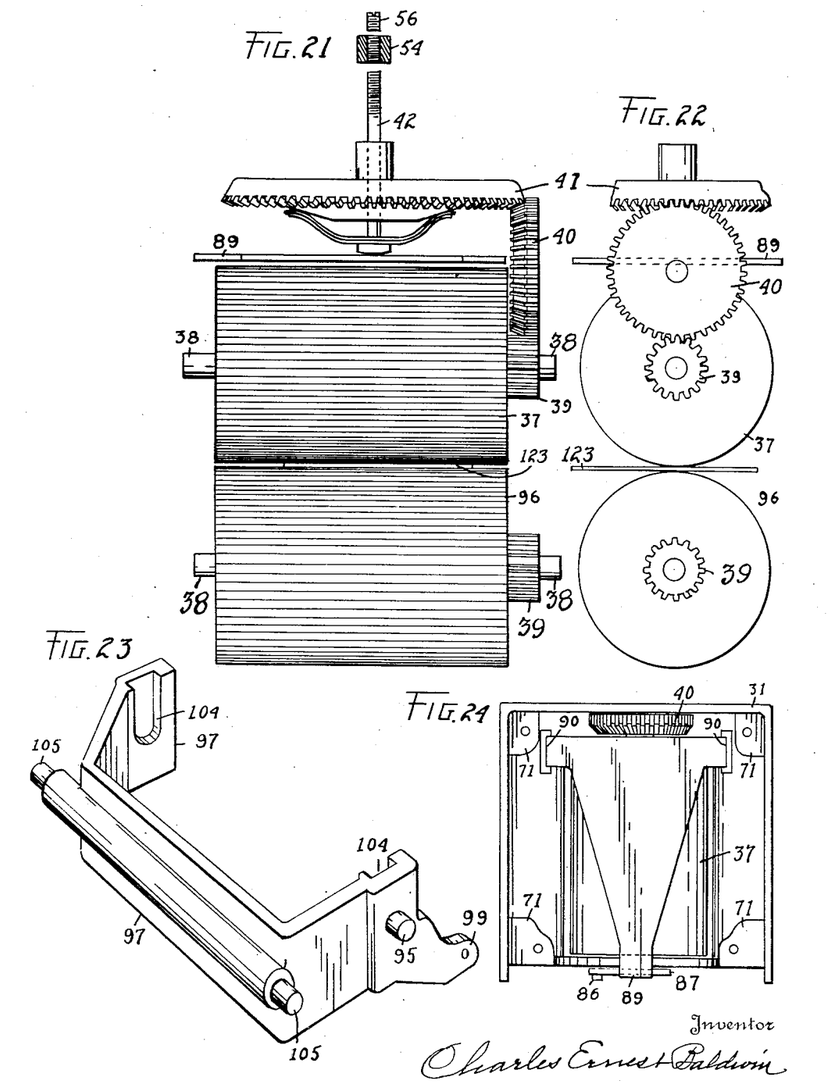
Fig. 21 is a side elevation of the operating rollers showing the gear connection thereto for operating the registering mechanism.
Fig. 22 is an end elevation of the same with the material passing through between said operating rollers to actuate the same.
Fig. 23 shows a detail perspective view of the pivot hanger plate for the lower roller which permits its movement away from the upper roller.
Fig. 24 is a plan view of the portion of the frame which supports the upper operating roll and the major portion of the measuring mechanism, said measuring mechanism being removed therefrom and showing the construction and arrangement of the frame.

The upwardly extending arm of the bell crank lever 73 has the projection 84 thereon with the lost motion slot 85 therein, which engages the stud 86 on the cam plate 87, which cam plate 87 is pivotally mounted on the stud or post 88 of the frame portion 31. The cam plate 87 raises the rear end of the plate 89, which plate 89 is preferably shaped as shown in Fig. 24, and rests as a three-point rest on the portion 31 of the supporting frame, the two front resting points 90 acting as pivots for said plate 89, and the rear point bearing upon the cam plate 87 when in the raised position to support the lower end of the shaft 42 as shown in Figs. 18 and 19. The plate 89 also assists in holding the double gear 40 in position upon its journal post.

The horizontally extending arm 91 of the bell crank lever 73 has the stud 92 thereon to pivotally receive the upper end of the link plate 93, which link plate has the open-ended slot 94 in its lower end which extends over the stud 95 of the lower operating roll yoke 96, the open-ended slot 94 permitting the quick assemblage and allowing for lost motion in the movement of the bell crank lever 73. The yoke or bracket 97 is pivotally attached at 98 on the bracket part 27 and bears the stud 95 thereon.

Th arm 99 has a hole therethrough to receive the lower end of the tension spring 100 therethrough, the upper end of the tension spring being supported by an adjusting bolt 101 which slips into the notch 102 in the edge of the plate 58 so that any desired tension can be given to said spring 100 and the roll 96 supported thereon. The lower roll 96 preferably is a duplicate of the upper roll 37 having the gear 39 thereon so that said rolls may be cast in the same mold and be interchangeable, though said lower roll 96 may have a rubber covering which holds firmly over its ribbed periphery when desired for handling delicate materials to ensure the proper actuation of the measuring mechanism.

Figure 14:
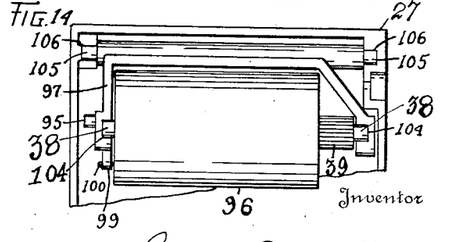
Fig. 14 is a top plan view of the lower operating roll and the pivotally mounted bracket in which said roll is mounted, and that portion of the supporting frame which hingingly supports said supporting bracket and said lower roll.

The lower roll 96 is pivotally supported in the cast bracket 97 which has the slots 104 for the journals of the lower roll 96. The bracket 97 has the journals 105 on its rear side, which pivotally engage in slots 106 in the frame portion 27 as shown in Fig. 14. This permits the lower roll 96 to swing upward and downward on the pivots or journals 105 under the tension of the spring.

The lower roll 96 and its supporting bracket 97 are covered by the plates 107 and 108 which are attached through the lugs 109 and 110, which plates 107 and 108 have the opening 111 for the lower roll 96 to extend up therethrough, and the starting arrow 112 and releasing lever 113. The releasing lever 113 extends through and up the rear side of part 31 and is pivotally attached to the crosswise lever 114, which lever 114 is pivotally attached on the stud 88 and extends through beneath the locking lever 75. It is apparent that downward pressure upon the lever 113 as it extends through the plate 107 will move said locking lever 75 upward, releasing the same and thereby placing the measuring mechanism in normal position for starting the measurement.

The starting or releasing lever 113 is placed alongside the knife 115, which is pivotally attached within the part 27 of the supporting frame and housed within the part 116. A slot 117 is provided in the plate 107 so that said knife 115 can be turned downward, cutting a notch in the edge of the cloth directly in line with the starting arrow 112 at the close of the measurement, thus correctly completing the measurement.

In measuring fabrics and other materials which may be drawn through between the rollers, the operation of the measuring machine is as follows: The end of the fabric 123 is placed on line with the point of the arrow 112 and held by the hand of the operator and the same hand is free to press down on the releasing lever 113 which permits the operating rolls 37 and 96 to spring together under the tension of the springs 79 and 100, thereby clamping the fabric therebetween. The fabric 123 is then drawn through the rolls, passing over said arrow at the starting point, thereby actuating the measuring mechanism as hereinbefore described, causing the pointer 43 to turn, registering the number of inches, or yards and inches, or yards and a portion of a yard, until the desired measurement is attained, at which point the knife 115 is pressed downward, notching the edge of the fabric at the end of the measurement, after which the locking lever 75 is pressed inward into locking position, thereby releasing the fabric, permitting the cutting of the same.

The inward pressure of the locking lever 75 presses the sliding re-setting or carrier plate 64 sidewise and the heart-shaped cams 44 on the units and tens disks return said disks and the pointer 43 to the zero or neutral position, which resetting of the parts is fully accomplished by the release of the locking lever 75 and the return of the resetting or carrier plate 64 with the units disk thereon to the normal starting position for a new measurement.

The action of the registering mechanism in the release of the pointer 43 is as follows: The cam plate 87 raises the rear end of the plate 89, thereby raising the shaft or bolt 42 which is directly over and just out of contact with said plate 89 so that when the cam plate 87 is raised by the bell crank 73, as shown in Fig. 18, the shaft 42 is pressed upward against the tension of the spring 118, thereby pressing the adjustable tension nut 54 upward out of contact with the upwardly projecting end of the heart-shaped cam 44, thereby releasing the frictional contact of said heart-shaped cam 44 with the gear 41 and the tension nut 54 and permitting the free action of said cam 44.

Figure 12:
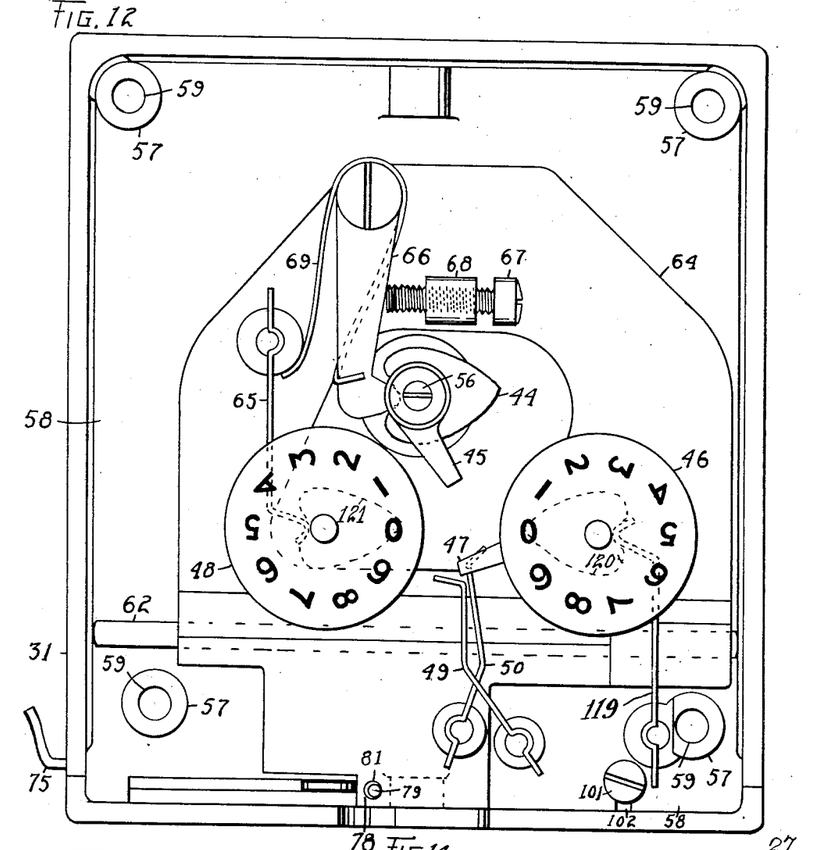
Fig. 12 is a substantially full sized top plan view of the units and tens yard indicator dials in position on the supporting frame and slidable plate, the main yard dial being removed to show the actuating mechanism for the pointer and dials, the units and tens indicator dials being in the zero or inoperative position.
Figure 13:
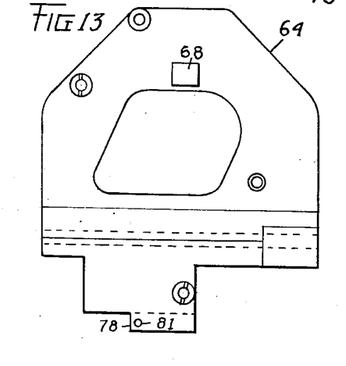
Fig. 13 is a plan view of the sliding carrier or resetting plate removed from the machine.
Figure 15:
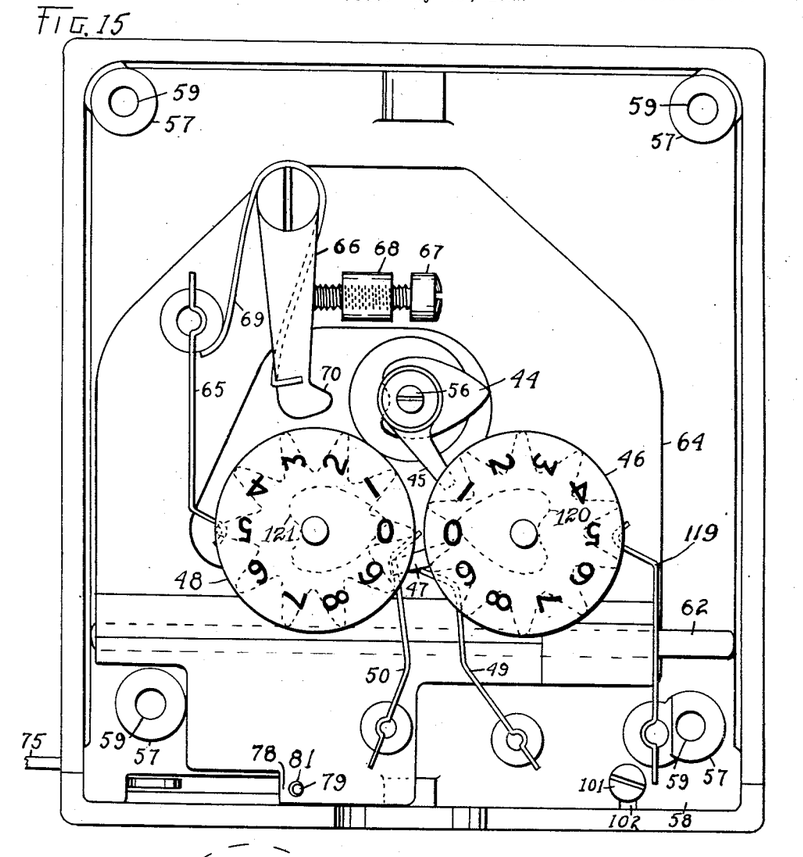
Fig. 15 is a similar view with the mechanism released to the operative position, ready to begin the measurement.
Figure 16:
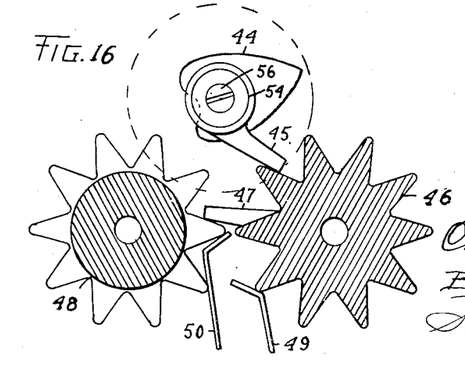
Fig. 16 is a sectional view at line 16—16 in Fig. 11 showing the operating mechanism for said units and the indicator dials in the actuating position.

The inward movement of the lever 75 and bell crank 73 moves the sliding plate 64 sufficiently to one side to permit the spring lever or dog 66 to contact with the heart-shaped cam 44 on that point of its periphery to which it has been moved by the measurement indicated by the pointer 43, said spring lever or dog 66 turning said heart-shaped cam 44 to the zero or neutral position by passing into the V-shaped end of said cam 44, thereby holding said cam and the parts firmly in said neutral position ready for the beginning of a new measurement. The units and tens counting disks 46 and 48 also have the heart-shaped resetting cams 120 and 121 thereon under the control of springs 65 and 119, and the resetting of the pointer 43 by the cam 44 simultaneously resets said counters 46 and 48 at the zero position through springs 65 and 119 pressing on as shown in Figs. 12 and 15.

The guard plates 103 are upward projections of plates 107 and 108 to stand against the rear plate of the frame portion 31 each side of the rolls 37 and 96 to prevent the fabric 123 from slipping behind the ends of said rolls or into the gearing to thereby hinder or clog the action of the operating rolls 37 and 96.

What is claimed as new is:

1. In a mechanism of the class described, means to move the units indicator disk away from the tens indicator disk midway of the return to zero actuation of said mechanism, and mechanism to return said tens and units indicator disks to zero while separated from each other.

2. In a mechanism of the class described, a tens indicator disk rotatably mounted on a fixed plate in said mechanism, a units disk rotatably mounted on a plate slidably mounted on said fixed plate to move to and from said tens indicator disk, a shaft central of said mechanism having an actuating arm for said indicator disks, cams on said shaft and indicator disks to return the same to zero, and means to move said units indicator disk away from said tens indicator disk and said shaft midway of the return to zero actuation of said mechanism to permit said tens and units indicator disks to be returned to zero while disconnected.

3. In a mechanism of the class described, a tens indicator disk rotatably mounted on a fixed plate in said mechanism, a units disk rotatably mounted on a plate slidably mounted on said fixed plate to move to and from said tens indicator disk, a shaft central of said mechanism having an actuating arm for said indicator disks, cams on said shaft and indicator disks to return the same to zero, lever actuation to move said slidable plate and the units indicator disk thereon away from said tens indicator disk and said shaft midway of the return to zero actuation of said mechanism, a resilient arm on said slidable plate to engage the cam on said tens indicator disk and return said disk to zero when said slidable plate is actuated, and a resilient arm on said fixed plate to engage the cam on said units indicator disk to return the same to zero when said slidable plate is actuated.

In testimony whereof I have affixed my signature in the presence of two witnesses.

CHARLES ERNEST BALDWIN.

Witnesses:
  THEO. THOMAS HAAG,
  CORINNE V. SWANSON.